United States Patent
Engelman et al.

(10) Patent No.: US 6,677,855 B2
(45) Date of Patent: Jan. 13, 2004

(54) SYSTEM TO DETERMINE THE INTENT TO BRAKE AND TO PROVIDE INITIATION AND ENGAGEMENT OF THE BRAKE SYSTEM

(75) Inventors: Gerald H. Engelman, Dearborn, MI (US); John Patrick Joyce, Grosse Pointe Park, MI (US); Jeffrey Dan Rupp, Ann Arbor, MI (US); Leonard Murray Brown, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/682,364

(22) Filed: Aug. 24, 2001

(65) Prior Publication Data

US 2003/0038715 A1 Feb. 27, 2003

(51) Int. Cl.⁷ .................................................. B60Q 1/00
(52) U.S. Cl. ........................ 340/439; 340/441; 340/464; 340/467; 340/479; 303/7; 73/9; 73/118.1
(58) Field of Search ............................. 340/43, 9–441, 340/464, 467, 479; 303/7, 122.05, 15, 9.62; 73/9, 118.1

(56) References Cited

U.S. PATENT DOCUMENTS

| | | | |
|---|---|---|---|
| 4,483,421 A | * 11/1984 | Kennelly | 188/16 |
| 4,788,526 A | 11/1988 | Eckstein et al. | 340/461 |
| 4,823,109 A | * 4/1989 | Boyer | 340/467 |
| 4,861,118 A | * 8/1989 | Burckhardt et al. | 303/113.2 |
| 4,895,021 A | * 1/1990 | Ishizeki | 73/118.1 |
| 4,916,431 A | 4/1990 | Gearey | 340/479 |
| 4,952,909 A | 8/1990 | Woerner et al. | 340/464 |
| 4,959,634 A | 9/1990 | Miller | 340/467 |
| 5,023,599 A | 6/1991 | Mitchell et al. | 340/467 |
| 5,173,859 A | 12/1992 | Deering | 701/70 |
| 5,210,522 A | 5/1993 | Hoekman et al. | 340/467 |
| 5,231,373 A | 7/1993 | Freeman et al. | 340/469 |
| 5,314,037 A | 5/1994 | Shaw et al. | 180/169 |
| 5,376,918 A | 12/1994 | Vinciguerra et al. | 340/479 |
| 5,387,898 A | 2/1995 | Yeheskel et al. | 340/479 |
| 5,477,456 A | * 12/1995 | Fennel et al. | 701/71 |
| 5,480,221 A | * 1/1996 | Morita et al. | 303/113.5 |
| 5,481,243 A | 1/1996 | Lurie et al. | 340/467 |
| 5,589,817 A | 12/1996 | Furness | 340/467 |
| 5,653,515 A | * 8/1997 | Takeda et al. | 303/138 |
| 5,805,060 A | 9/1998 | Schroeder | 340/467 |
| 5,942,972 A | 8/1999 | Kaner | 340/479 |
| 5,967,626 A | * 10/1999 | Terao et al. | 303/138 |
| 5,969,602 A | 10/1999 | Marks | 340/467 |
| 6,002,329 A | 12/1999 | Marks | 340/467 |
| 6,160,476 A | * 12/2000 | Ponziani | 340/479 |
| 6,322,164 B1 | * 11/2001 | Sakamoto et al. | 303/115.4 |

OTHER PUBLICATIONS

Olson, Paul L., "An Evaluation of the Advance Braking Light Device", 1989, 10 pages.
Bosch, Robert, Brake Systems for Passenger Cars, Technical Instruction, 1995, 62 pages.
Koter, Reuven, "Advanced Indication of Braking: A Practical Safety Measure . . . ", 1994, 10 pages.
Avraham D. Horowitz, "Human Factors Issues in Advanced Rear Signaling Systems", 1994, 7 pages.

* cited by examiner

Primary Examiner—Daryl Pope
(74) Attorney, Agent, or Firm—Gregory P. Brown

(57) ABSTRACT

An early braking system for a vehicle having wheels comprising, a friction element, a brake pedal and a sensor. The friction element inhibits rotation of the wheels of the vehicle with the braking system having a dormant state wherein the friction element is at a first position spaced a first distance from the wheels. The brake pedal is adapted to be depressed to move the friction element into engagement with a portion of the wheels of the vehicle. The sensor senses an operational parameter of the vehicle. The friction element moves from the first position to a second position spaced a second distance from the wheels in response to a predetermined measurement of the operational parameter and before depression of the brake pedal, wherein the second position is closer to the wheels than the first position.

20 Claims, 3 Drawing Sheets

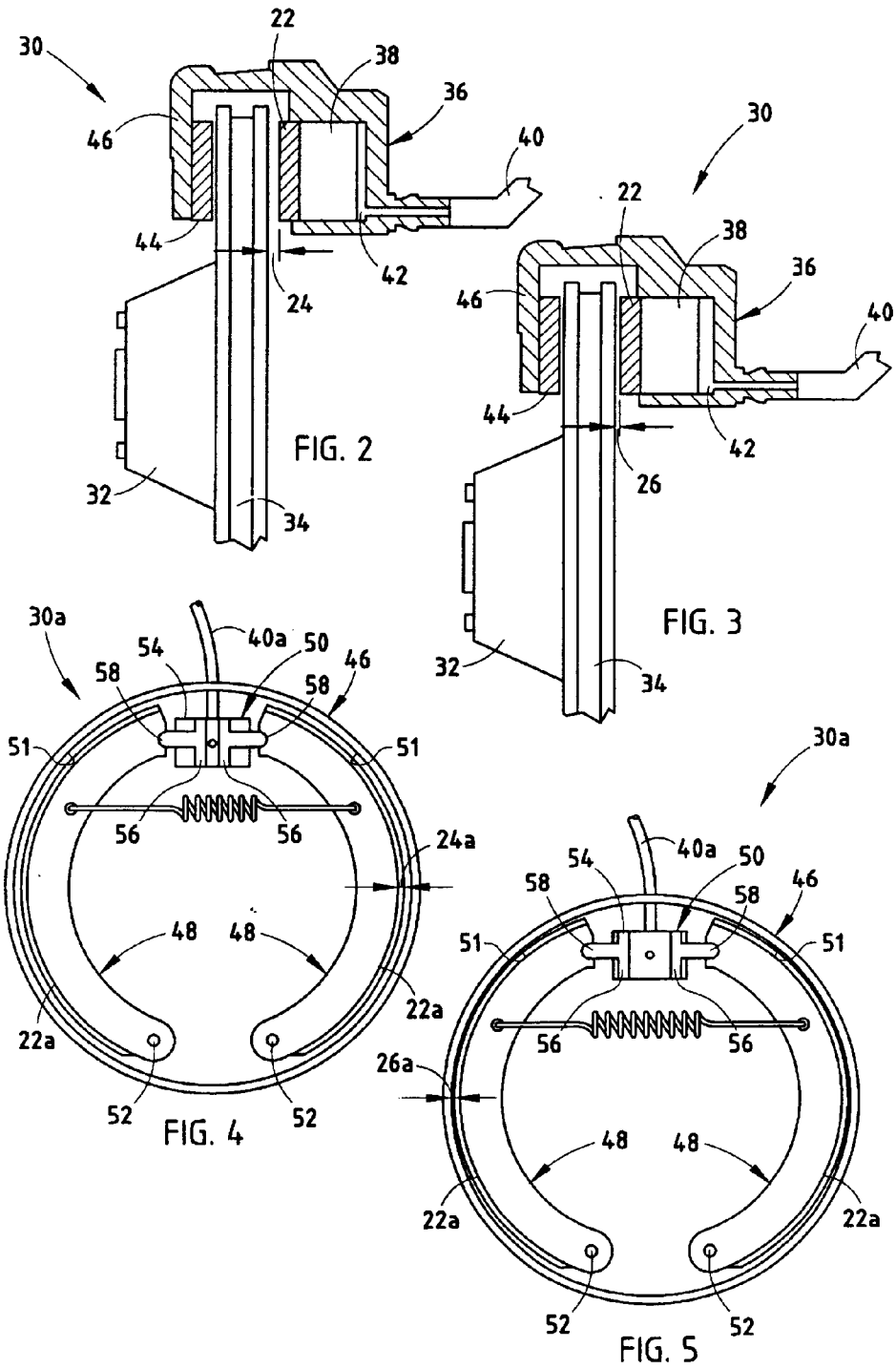

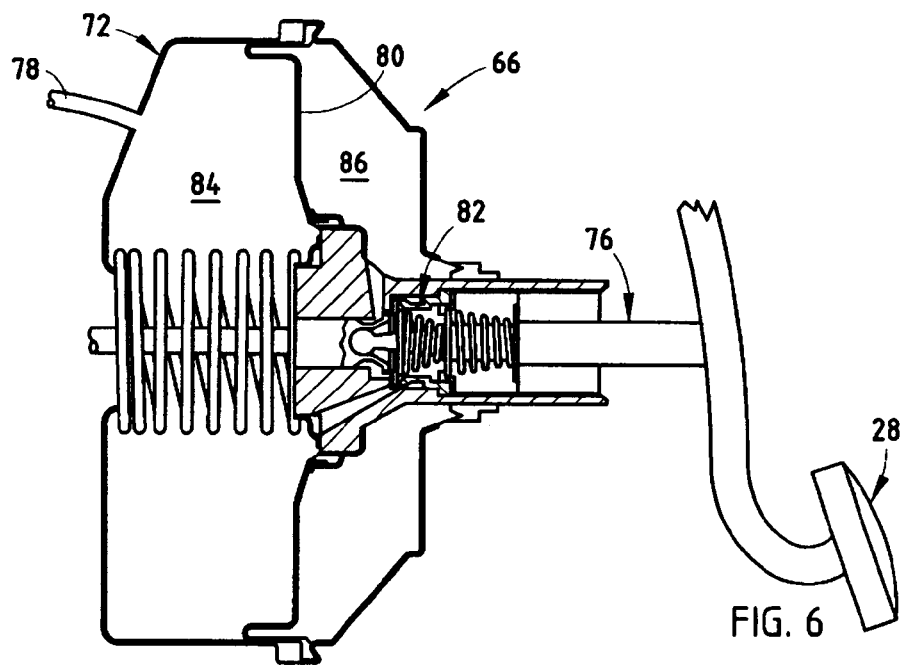
FIG. 6
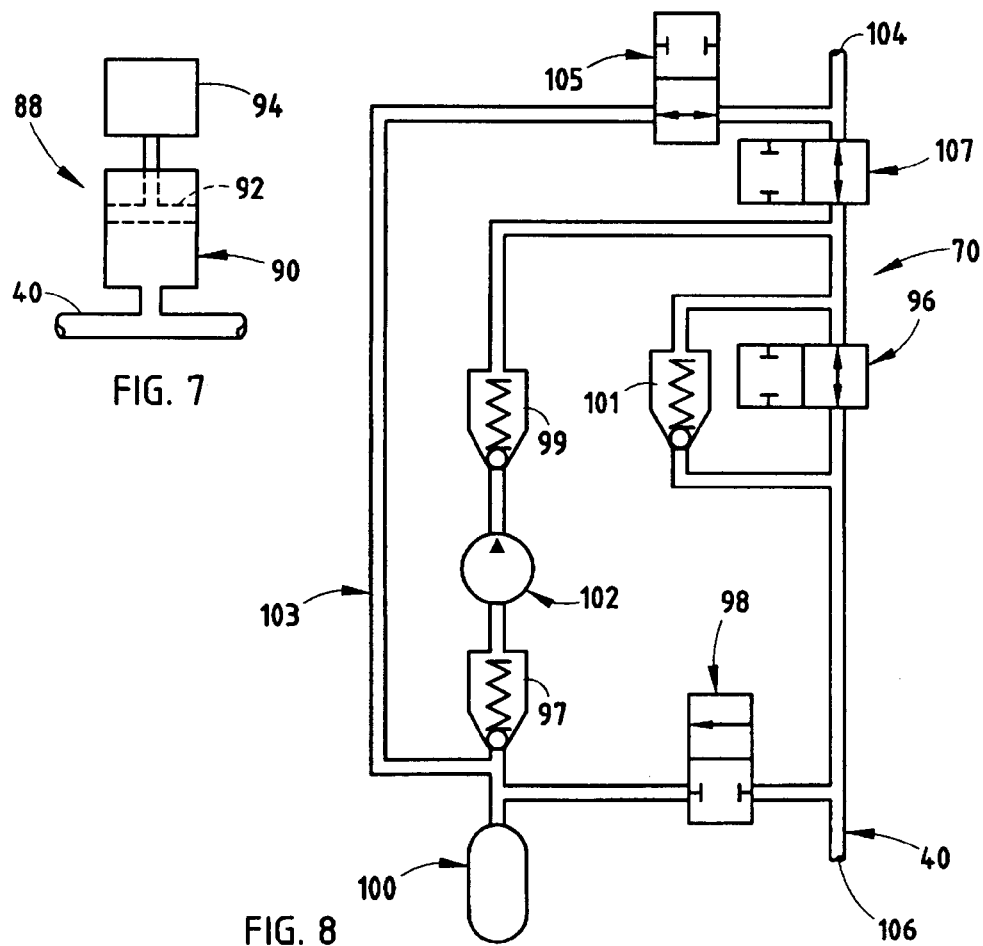
FIG. 7
FIG. 8

SYSTEM TO DETERMINE THE INTENT TO BRAKE AND TO PROVIDE INITIATION AND ENGAGEMENT OF THE BRAKE SYSTEM

BACKGROUND OF INVENTION

The present invention relates to braking of a vehicle, and in particular to a brake system of a vehicle.

Vehicles currently have brake systems that are used to inhibit rotation of the wheels of the vehicle to decelerate and stop the vehicle. The brake systems of the vehicles also have warning lights to notify nearby drivers that the driver of the vehicle is about to decelerate or stop the vehicle.

Heretofore, automotive braking systems are activated by the driver depressing a brake pedal. The onset of a driver's intent to begin decelerating a vehicle, however, occurs prior to actually depressing the brake pedal. The elapsed time between these two events results in delayed warning of intent to following drivers via the warning lights and delayed braking of the vehicle (initiation delays). An additional form of delay (engagement delays) exists in the actual energizing of the warning lights and brake system from a totally dormant state to the fully active state. While these types of delay only last a fraction of a second, reducing these delays on this order of magnitude can mean significant improvement in stopping distance for both the braking vehicle and following vehicles, with the actual magnitude dependent on the vehicles" initial rate of travel. Stopping distance improvement can eliminate collisions or reduce the kinetic energy of a collision thereby improving safety of all involved and reducing property damage.

Some vehicles have included early warning light activation wherein the warning lights emit visible light before the vehicle is actually braking to indicate to following drivers that the driver of the vehicle is about to brake. However, early warning light activation can provide false positives wherein the driver actually does not have an intention to brake. Some traffic laws state that warning lights must indicate brake activation only when the brake systems are activated by the brake pedal. Furthermore, the lighting of warning lights when a vehicle does not brake can increase traffic congestion. Therefore, early warning light activation is undesirable.

Another alternative is to preheat the tungsten filament in a warning light continuously at a low voltage (below visible) coupled with a brief overvoltage at the time of application of the brake pedal. However, the continuously low voltage can reduce the life span of the warning lights.

Accordingly, a practical, economical braking system solving the aforementioned disadvantages and having the aforementioned advantages is desired.

SUMMARY OF INVENTION

An aspect of the present invention is to provide an early braking system for a vehicle comprising wheels, a braking system and a sensor. The braking system includes a friction element for inhibiting rotation of the wheels of the vehicle and a brake pedal adapted to be depressed to move the friction element into engagement with a portion of the wheels of the vehicle. The braking system has a dormant state wherein the friction element is at a first position spaced a first distance from the wheels. The sensor senses an operational parameter of the vehicle. The friction element moves from the first position to a second position spaced a second distance from the wheels in response to a predetermined measurement of the operational parameter and before depression of the brake pedal, wherein the second position is closer to the wheels than the first position.

Another aspect of the present invention is to provide an early brake warning system for a vehicle comprising a throttle for the vehicle, a sensor and a brake light. The sensor senses an operational parameter of the throttle. The brake light has a non-energized state wherein no energy is applied to the brake light, an energized state wherein a high energy is applied to the brake light such that the brake light emits visible light and a pre-energized state wherein a low energy is applied to the brake light whereby the brake light does not emit visible light. The brake light is energized from the non-energized state to the pre-energized state in response to a predetermined measurement of the operational parameter of the throttle.

Yet another aspect of the present invention is to provide a method of initiating braking for a vehicle having wheels. The method includes the steps of providing a braking system having a friction element for inhibiting rotation of the wheels of the vehicle. The braking system further includes a brake pedal adapted to be depressed to move the friction element into engagement with a portion of the wheels of the vehicle. The braking system also has a dormant state wherein the friction element is at a first position spaced a first distance from the wheels. The method further includes the step of sensing an operational parameter of the vehicle with a sensor. The method further includes the step of moving the friction element from the first position to a second position spaced a second distance from the wheels in response to a predetermined measurement of the operational parameter and before depression of the brake pedal, wherein the second position is closer to the wheels than the first position.

The early braking system and the early brake warning system are efficient in use, economical to install, capable of a long operable life, and particularly adapted for the proposed use.

These and other features, advantages, and objects of the present invention will be further understood and appreciated by those skilled in the art by reference to the following specification, claims and appended drawings.

BRIEF DESCRIPTION OF DRAWINGS

FIG. 2 is a cross-sectional view of a disc brake with a brake pad at a first location of the present invention;

FIG. 3 is a cross-sectional view of the disc brake with the brake pad at a second location of the present invention;

FIG. 4 is a cross-sectional view of a drum brake with a brake shoe at a first location of the present invention;

FIG. 5 is a cross-sectional view of a drum brake with the brake shoe at a second location of the present invention;

FIG. 6 is a cross-sectional view of a brake pedal and a vacuum booster of the present invention;

FIG. 7 is a cross-sectional view of a brake line and a fluid injection system of the present invention; and FIG. 8 is a block diagram illustrating an anti-lock braking and traction control system of the present invention.

DETAILED DESCRIPTION

Figure 1:
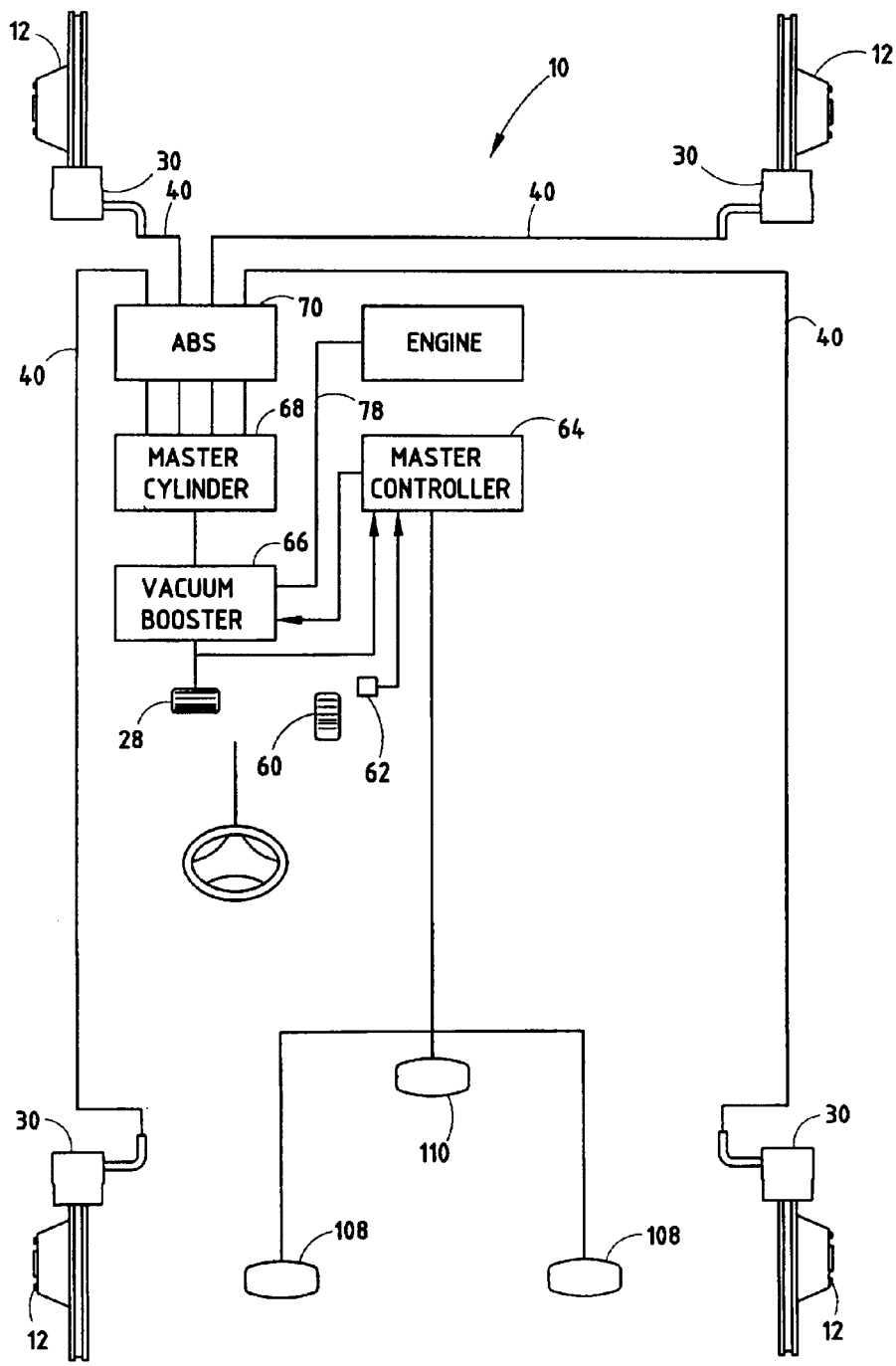
FIG. 1 is a block diagram illustrating a vehicle embodying an early braking system and an early brake warning system according to the present invention.

For purposes of description herein, the terms "upper," "lower," "right," "left," "rear," "front," "vertical,"

"horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, reference number 10 generally designates a vehicle 10 embodying the present invention. The vehicle 10 includes wheels 12 for the vehicle 10, a braking system and a sensor 14. The braking system includes a friction element 22 for inhibiting rotation of the wheels 12 of the vehicle 10. The braking system further includes a brake pedal 28 adapted to be depressed to move the friction element 22 into engagement with a portion of the wheels 12 of the vehicle 10. The braking system has a dormant state wherein the friction element 22 is at a first position spaced a first distance 24 (FIG. 2) from the wheels 12. The sensor 14 senses an operational parameter of the vehicle 10. The friction element 22 moves from the first position to a second position spaced a second distance 26 (FIG. 3) from the wheels 12 in response to a predetermined measurement of the operational parameter and before depression of the brake pedal 28, wherein the second position is closer to the wheels 12 than the first position.

The illustrated early braking system of the vehicle 10 is used to anticipate braking of the vehicle 10 and prepare the vehicle 10 for braking. The early braking system therefore moves the friction element 22 from the first position to the second position to prepare the vehicle 10 for braking before actual application of the brake pedal 28 by the operator (driver). The friction element 22, when engaged with a portion of the wheel 12, inhibits the wheels 12 from rotating to thereby slow and decelerate the vehicle 10. With the early braking system of the present invention, the friction element 22 is closer to or slightly engaged with the wheel 12 such that rotation of the wheel 12 is not inhibited. However, the friction element 22 will engage the portion of the wheel 12 to slow rotation of the wheel 12 quicker when the friction element 22 moves from the second position 26 than when the friction element moves from the first position 24. Consequently, the early braking system will reduce the time period needed to adequately slow or stop the vehicle 10.

The illustrated friction element of the present invention can be either a brake pad in a disc brake system 30 (FIGS. 2 and 3) or a brake pad on a brake shoe 48 in a drum brake system 30a (FIGS. 3 and 4). In the illustrated example (FIG. 1), each wheel 12 of the vehicle 10 is associated with one disc brake system 30. The disc brake system 30 includes a hub 32, a rotor 34, a caliper 36, a piston 38 and a brake fluid line 40. The wheel 12 of the vehicle 10 includes the hub 32, a tire (not shown) and the rotor 34. Therefore, the hub 32 and the rotor 34 will rotate with the tire. The caliper 36 straddles the rotor 34 and a bore 42 in the caliper 32 faces the rotor 34. The piston 38 is located in the bore 42 and also faces the rotor 34. The brake fluid line 40 is fluidly connected to the bore 42 at a position behind the piston 38 and supplies a fluid to the bore 42 to force the piston 38 out of the bore 42 towards the rotor 34. The brake pad 22 is attached to an end of the piston 38 facing the rotor 34 and therefore is configured for engagement with the rotor 34. The disc brake system 30 illustrated in FIGS. 2 and 3 is a floating-caliper disc brake system. Therefore, a static brake pad 44 is connected to an arm 46 of the caliper 36 opposite the brake pad 22 and the piston 38. When the brake pad 22 on the piston 38 abuts the rotor 38, the caliper 36 will be forced to the right as seen in FIG. 2 such that the static brake pad 44 will abut a face of the rotor 36 opposite the brake pad 22. The disc brake system 30 could also be a fixed-caliper disc brake system having a second piston and brake pad 22 instead of the static brake pad 44. The floating-caliper disc brake system and the fixed-caliper disc brake system as described directly above are known to those skilled in the art.

In the early braking system of the present invention, the brake pad 22 is situated at the first location spaced the first distance 24 from the rotor 34 (FIG. 2) before the early braking system is initiated and when the brake pedal 28 is not depressed. Once the early braking system is activated and before the brake pedal 28 is depressed, a small amount of fluid will be forced from the brake fluid line 40 and into the bore 42 in order to move the brake pad 22 closer to the rotor 34. The brake pad 22 will therefore be in the second position at the second distance 26 from the rotor 34, which is closer to the rotor 34 than the first position. The second location may place the brake pad 22 in engagement with the rotor 34, but the brake pad 22 in the second position will not significantly inhibit rotation of the wheel 12. Consequently, the vehicle 10 will not significantly slow or decelerate when the brake pad 22 is in the second position. Once the brake pedal 28 is depressed, more fluid will be forced behind the piston 38 to force the brake pad 22 into significant engagement with the rotor 34 such that the vehicle 10 will begin to decelerate. Therefore, the early braking system will reduce the time required to move the brake pad 22 into engagement with the wheel 12 when the brake pedal 28 is depressed because the brake pad 22 will only have to travel the second distance 26, and not the first distance 24, before the brake pad 22 significantly engages the wheel 12.

The reference numeral 30a (FIGS. 4 and 5) generally designates a second preferred embodiment of the invention, having the drum brake system. Since the drum brake system 30a is similar to the previously described disc brake system 30, similar parts appearing in FIGS. 2–3 and FIGS. 4–5, respectively, are represented by the same, corresponding reference numeral, except for the suffix "a" in the numerals of the latter. Drum brake systems 30a are sometimes used in place of a disc brake system 30 for the rear wheels 12 of a vehicle 10. Drum brake systems 30a have also been used on all four wheels 12 of older vehicles 10.

The illustrated drum brake system 30a includes a drum 46, a pair of brake shoes 48, a wheel-brake cylinder 50 and a brake fluid line 40a. The wheel 12 includes the tire and the drum 46. The brake shoes 48 are C-shaped and located within the drum 46. Each brake shoe 48 has a bearing 52 that allows the brake shoes 48 to pivot outward to allow the brake pad 22a on an outside surface of the brake shoe 48 to engage an inside surface 51 of the drum 46. The wheel-brake cylinder 50 is connected to each brake shoe 48 and forces the brake shoes 48 outward to engage the drum 46. The wheel-brake cylinder 50 includes a cylindrical housing 54 with a pair of pistons 56 located within the housing 54. Each piston 56 includes an arm 58 connected to the brake shoes 48 at an end opposite to the bearing 52. The brake fluid line 40a is fluidly connected to a middle portion of the cylindrical housing 54 and forces fluid into the cylindrical housing 54 to force the pistons 56 in opposite directions. Consequently, when fluid is forced into the cylindrical housing 54, the pistons 56 are forced outward to thereby push the brake shoes 48 towards the inside surface 51 of the drum 46. The drum brake system as described directly above is known to those skilled in the art.

In the early braking system of the present invention, the brake pads 22a of the brake shoes 48 are situated at the first location spaced the first distance 24a from the interior surface 51 of the drum 46 (FIG. 4) before the early braking system is initiated and when the brake pedal 28 is not depressed. Once the early braking system is activated and before the brake pedal 28 is depressed, a small amount of fluid will be forced from the brake fluid line 40a into the cylindrical housing 54 in order to move the brake pads 22a closer to the interior surface 51 of the drum 46. The brake pad 22a will therefore be in the second position at the second distance 26a from the interior surface of the drum 46, which is closer to the interior surface of the drum 46 than the first position. The second position may place the brake pads 22a in engagement with the interior surface 51 of the drum 46, but the brake pads 22a in the second position will not significantly inhibit rotation of the wheel 12. Consequently, the vehicle 10 will not significantly slow or decelerate when the brake pads 22a are in the second position. Once the brake pedal 28 is depressed, more fluid will be forced into the cylindrical housing 48 to thereby force the brake pads 22a into significant engagement with the inside surface 51 of the drum 48 such that the vehicle 10 will begin to decelerate. Therefore, the early braking system will reduce the time required to move the brake pads 22a into engagement with the wheel 12 when the brake pedal 28 is depressed because the brake pads 22 will only have to travel the second distance 26, and not the first distance 24, before the brake pads 22 significantly engage the wheel 12.

In the illustrated example, the brake pads 22 of the disc brake system 30 or the brake pads 22a of the drum brake system 30a move from the first location to the second location in response to the predetermined measurement of the operational parameter of the vehicle 10. The operational parameter in the present invention is any parameter that can be measured that would indicate an intention by the driver of the vehicle to brake the vehicle or that indicates that braking is imminent. Preferably, the operational parameter is a movement of an element past a certain point or a movement of an element between two locations. For example, the operational parameter can be the movement between the position of the acceleration pedal 60 between a fully depressed position and a non-depressed position. The operational parameter could also be the movement between any two positions of the acceleration pedal 60. If the acceleration pedal 60 is released, an intention by the driver of the vehicle to brake the vehicle can be ascertained. Furthermore, the operational parameter can also be the location of a foot of a driver of the vehicle 10. In this situation, the operational parameter can be the movement of the foot of the driver between the two locations as the foot depresses the acceleration pedal 60 as measured by the position of the acceleration pedal 60. Furthermore, the operational parameter could be measured by the position of the foot 16 of the driver 18 within the vehicle 10 as read by an optical sensor or any other device. Additionally, the operational parameter could be the movement of a throttle of the vehicle 10. The movement of the throttle can be measured by measuring the position of the acceleration pedal 60 as described directly above, measuring the position of the valve controlling the volume of vaporized fuel charge delivered to the cylinders of the engine of the vehicle 10, measuring any electrical or mechanical element positioned in the communication line between the acceleration pedal and the valve controlling the fuel charge delivered to the engine, measuring the vacuum level in the engine manifold or any other means of measuring measurement of the throttle. A further example of the operational parameter as being an indication that braking is imminent is the distance of a vehicle in front of the vehicle 10. The distance of the vehicle in front of the vehicle 10 could indicate that braking is imminent.

In the illustrated example, the predetermined measurement of the operational parameter is defined as a determination that the reading of the operational parameter indicates an intention by the driver of the vehicle to brake the vehicle or indicates that braking is imminent. Preferably, the predetermined measurement is a determination of the movement of the element past the certain point or the rate of movement of the element between the two locations. In the preferred embodiment, the predetermined measurement of the operational parameter is the rate of movement of the acceleration pedal 60 between a first acceleration pedal position and a second acceleration pedal position. The predetermined measurement can be made with a linear position sensor 62 that measures the linear position of the acceleration pedal 60. As the acceleration pedal moves between the first acceleration pedal position and the second acceleration pedal position, the linear position sensor 62 sends the position information to a master controller 64. The master controller 64 may include a general purpose microprocessor-based controller, and may include a commercially available off-the-shelf controller. The master controller 64 preferably includes a processor and memory for storing and processing software algorithms which process sensed vehicle information, including the positions of the acceleration pedal 60. The master controller 64 then determines if the acceleration pedal 60 has moved between the first acceleration pedal position and the second acceleration pedal position faster than a certain programmed rate. If the operational parameter of the acceleration pedal 60 occurred faster than the predetermined rate programmed into the master controller 64, the master controller 64 will tell the brake system to move the friction element 22 from the first location to the second location. Preferably, the predetermined rate is one that would indicate that the driver of the vehicle 10 is about to apply the brakes. Therefore, the predetermined rate would be the measurement of a person letting off of the acceleration pedal 60 from a high acceleration position to a position wherein the acceleration pedal is not depressed. Alternatively, if the operational parameter is a movement of the element past a certain point, the predetermined measurement will be the determination that the element has passed that point. When the operational parameter is the distance of a vehicle in front of the vehicle 10, the predetermined measurement could be a measurement of the distance of the vehicle in front of the vehicle 10 or the rate of change of the distance of the vehicle in front of the vehicle 10. If the vehicle in front of the vehicle 10 is too close or if the vehicle in front of the vehicle 10 is relatively approaching the vehicle 10 (i.e., moving closer to the vehicle 10 because the vehicle in front of the vehicle 10 is stopped or is stopping quicker than the vehicle 10), the friction element 22 would move to the second position.

In the preferred embodiment, after the friction element 22 has been moved to the second position in response to the predetermined measurement of the operational parameter, the friction element will move from the second position back to the first position if the brake pedal 28 has not been depressed within a certain time period. This can be controlled by the master controller 64. Therefore, the friction element 22 will not remain in the second position if the driver does not have an intention of braking the vehicle 10.

The design thresholds for the operational parameter and the predetermined measurement, including the degree and rate of release of the throttle, and the time that the friction element will remain in the second position without depression of the brake pedal can be established or even customized based on the vehicle manufacturer's desired brand identity, including the estimate and/or prediction of their customer's driving characteristics and desired reduction in delays before braking, the propensity for and degree of false activation, as well as compliance with applicable regulatory requirements.

The illustrated vehicle 10 includes the brake system having the disc brake system 30 and the brake pedal 28 as described above. The brake system as illustrated in FIG. 1 also includes a boost chamber 66, a master cylinder 68 and an anti-lock braking system 70 communicating depression of the brake pedal 28 to the disc brake system 30. Preferably, the master controller 64 communicates a message to the boost chamber 66 or the anti-lock braking system 70 to move the friction element 22 from the first location to the second location. Except for the modification to the boost chamber 66 noted below, boost chambers 66, master cylinders 68 and anti-lock braking systems 70 as used in the present invention are known to those skilled in the art.

In a first embodiment of the present invention, the boost chamber 66 (FIG. 6) is used to supply fluid to the disc brake system 30 as described above to move the friction element 22 from the first location to the second location. In the illustrated example, the boost chamber 66 includes a boost chamber housing 72, a rod 74 for connection to the master cylinder 68, a brake pedal rod 76 connected to the brake pedal 28, a vacuum line 78 connected to the engine (see FIG. 1) and a diaphragm 80. The diaphragm 80 is located within the boost chamber housing 72 and divides the boost chamber housing 72 into a master cylinder side chamber 84 and a brake pedal side chamber 86. The rod 74 connected to the master cylinder 68 extends into the boost chamber housing 72 and is connected to one side of the diaphragm 80. The brake pedal rod 76 also extends into the boost chamber housing 72 and is connected to the other side of the diaphragm 80. The vacuum line 78 is fluidly connected to each of the master cylinder side chamber 84 and the brake pedal side chamber 86. The vacuum line 78 is also fluidly connected to the engine (see FIG. 1). The boost chamber 66 works by first having the engine create a partial vacuum within the master cylinder side chamber 84 and the brake pedal side chamber 86. When the brake pedal 28 is depressed, the brake pedal rod 76 cracks open a valve 82 that allows air from the atmosphere to enter the brake pedal side chamber 86 while the vacuum line 78 is simultaneously sealed off from the brake pedal side chamber 86. Therefore, the pressure within the brake pedal side chamber 86 is greater than the pressure within the master cylinder side chamber 84, which causes the diaphragm 80 to push the rod 74 into the master cylinder 68. Consequently, the force applied to the master cylinder 68 by the rod 74 is the manual force applied to the brake pedal rod 76 through depression of the brake pedal 18 and the force supplied by the boost chamber 66. This force is in turn supplied to the fluid in the fluid lines 40 connected to the disc brake system 30 to move the brake pad 22 into engagement with the rotor 34. Furthermore, when the brake pedal 28 is released, the valve 82 seals off the air from the atmosphere and reopens the vacuum line 78 to the brake pedal side chamber 86 to allow the boost chamber 66 to return to its initial condition.

The illustrated boost chamber 66 will move the friction element 22 from the first position to the second position by modifying the valve 82. The valve 82, in response to the predetermined measurement of the operational parameter, will allow a small amount of air from the atmosphere to enter the brake pedal side chamber 86 and simultaneously seal off the vacuum line 78 from the brake pedal side chamber 86 before application of the brake pedal 28. The amount of air allowed into the brake pedal side chamber 86 without depression of the brake pedal will push the diaphragm 80 and its associated master cylinder rod 74 such that an amount of brake fluid will enter into the bore 42 of the disc brake system 30 to push the brake pad 22 from the first location to the second location. If the brake pedal 28 is not thereafter depressed within the time programmed into the master controller 64, the valve 82 will close to return the boost chamber 66 to its initial condition as described above. It is contemplated that the valve 82 can be directed by a linear actuator (not shown), under control of the master controller 64, that forces the brake pedal rod 76 into the valve 82 to crack open the valve 82 as described above. Alternatively, in a brake-by-wire system, the master controller 64, which would control the brake pedal rod 76, could force the brake pedal rod 76 into the valve 82 to crack open the valve 82. Such brake-by-wire systems are known to those skilled in the art.

In a second embodiment of the present invention, a fluid injection system 88 (FIG. 7) is used to supply fluid to the disc brake system 30 as described above to move the friction element 22 from the first location to the second location. One fluid injection system 88 is preferably fluidly connected to each brake line 40 of the disc brake system 30. The fluid injection system 88 preferably includes a reservoir 90 fluidly connected to one of the brake lines 40, a piston 92 and a motor 94. The reservoir 90 holds a small amount of brake fluid and the piston 92, driven by the motor 94, will push the small amount of brake fluid into the brake line 40 after the predetermined measurement of the operational parameter. The small amount of brake fluid that enters the brake line 40 will thereafter enter the bore 42 of the disc brake system 30 to push the piston 38 and the brake pad 22 from the first location to the second location. The master controller 64 preferably directs the motor 94 to actuate the piston 92 in response to the predetermined measurement of the operational parameter. If the brake pedal 28 has not been depressed a certain time after the predetermined measurement of the operational parameter, the piston 92 will move backwards to allow the small amount of fluid to reenter the reservoir 90 to allow the brake pad 22 to move from the second position to the first position.

In a third embodiment of the present invention, the anti-lock braking and traction control system 70 (FIG. 8) is used to supply fluid to the disc brake system 30 as described above to move the friction element 22 from the first location to the second location. The anti-lock braking and traction control system 70 includes, for each brake fluid line 40, a first valve 96, a second valve 98, a first check valve 97, a second check valve 99, a third check valve 101, an accumulator 100 and a pump 102. The anti-lock braking and traction control system 70 also includes a bypass line 103, a third valve 105 and a fourth valve 107. Preferably, only one bypass line 103, third valve 105 and fourth valve 106 are used in the system, with the bypass line 103 connected fluidly connected to each pump 102 for each wheel 12.

Under normal operating conditions of the vehicle 10 (i.e., when the anti-locking braking system 70 is not being employed), brake fluid from the master cylinder 68 enters the anti-lock braking and traction control system 70 through a first end 104, passes through the fourth valve 107, passes through the first valve 96 and continues out of the anti-lock braking and traction control system 70 through a second end 106 to the disc brake system 30. Furthermore, in this situation, the third valve 105 is closed such that the brake fluid cannot enter the bypass line 103 and the second valve 98 is closed such that the brake fluid cannot enter the accumulator 100 or the pump 102 (FIG. 8). However, when the wheel 12 associated with the individual anti-lock braking and traction control system 70 locks up, the first valve 96 will close and the second valve 98 will open such that the brake fluid in the disc brake system 30 will flow back to the anti-lock braking system 70 and be diverted through the second valve 98 into the accumulator 100. Once the wheel 12 is rotating again, the second valve 98 will close and the first valve 96 will reopen such that the brake fluid can once again flow to the disc brake system 30. In order to get the fluid pressure up to a level to allow the friction element 22 to significantly engage the rotor 34, the pump 102 pumps the fluid in the accumulator 100 back into the brake line 40.

After the predetermined measurement of the operational parameter of the present invention, the fourth valve 107 will close and the third valve 105 will open such that brake fluid can flow through the bypass line 103 to the pump 102. The pump 102 will thereafter pump a small amount of brake fluid from the bypass line 103 into the brake line 40 without normal activation of the anti-lock braking system 70 under direction of the master controller 64. The small amount of brake fluid that enters the brake line 40 will thereafter enter the bore 42 of the disc brake system 30 to push the piston 38 and the brake pad 22 from the first location to the second location. If the brake pedal 28 has not been depressed a certain time after the predetermined measurement of the operational parameter, the fourth valve 107 will open to allow the small amount of fluid to exit the bore 42 of the disc brake system 30 and to flow to the master cylinder. Furthermore, the third valve 105 will close. Therefore, the brake pad 22 to will move from the second position back to the first position.

The illustrated vehicle 10 of the present invention also includes a pair of rear brake lights 108 and a center high mounted brake light 110 in the rear dash of the vehicle 10. In addition to, or as an alternative to, the braking system of the present invention, the vehicle 10 can also pre-energize the rear brake lights 108 and the center high mounted brake light 110 at the predetermined measurement of the operational parameter of the throttle. The rear brake lights 108 and the center high mounted brake light 110 preferably include a filament that emits visible light when heated while a high voltage is applied to the filament. In a preferred embodiment, the filament is made of tungsten.

In the preferred embodiment, the rear brake lights 108 and the center high mounted brake light 110 have a non-energized state, wherein substantially no energy is applied to the brake lights 108 and 110; an energized state, wherein a high energy is applied to the brake lights 108 and 110 such that the brake lights 108 and 110 emit visible light; and a pre-energized state, wherein a low energy is applied to the brake lights 108 and 110 whereby the brake lights do not emit any significant visible light. Preferably, the energy applied to the lights 108 and 110 is a measurement of the voltage applied to the lights 108 and 110. When the predetermined measurement of the operational parameter of the throttle is made as discussed above, brake lights 108 and 110 will go from the non-energized state to the pre-energized state. Therefore, no visible light will be emitted from the brake lights 108 and 110. However, when the brake pedal 28 is depressed, the lights 108 and 110 will go from the pre-energized state to the energized state to emit light and to notify drivers following the vehicle 10 that the driver of the vehicle 10 is applying the brakes. Since the filament in the lights 108 and 110 must be heated to emit visible light, pre-energizing the lights 108 and 110 will heat the filament to a level below the level wherein they emit visible light. However, the time required to heat the filaments to a level where they emit visible light will be less when the filaments begin at the pre-energized state than when they begin at the non-energized state. Furthermore, similar to the brake system of the present invention, if the brake pedal 28 is not depressed within a certain period of time, the lights 108 and 110 will go from the pre-energized state back to the non-energized state.

The early braking system of the present invention will therefore allow a driver of the vehicle 10 to decelerate and stop the vehicle quickly. The early braking system determines an intention of braking by the driver of the vehicle and prepares the vehicle for braking. Therefore, the time until the brakes are engaged is reduced. Furthermore, the early warning braking system will also determine the intention of braking by the driver of the vehicle and prepare the brake lights accordingly. Therefore, the brake lights will emit visible light to notify drivers behind the vehicle that the vehicle is about to slow or stop by pre-energizing the brake lights.

In the forgoing description, it will be readily appreciated by those skilled in the art that modifications may be made to the invention without departing from the concepts disclosed herein. For example, in addition to the movement of the friction element from the first position to the second position and pre-energizing the brake lights, the system could unlock the transmission torque converter of the vehicle for smoothness on conventionally powered vehicles, lock the transmission torque converter in the regenerative braking vehicle to improve energy recovery, shift the transmission in a regenerative braking vehicle to improve energy recovery, and stiffen shock absorbers to reduce body pitch during braking. Such modifications are to be considered as included in the following claims, unless these claims by their language expressly state otherwise.

What is claimed is:

1. An early braking system for a vehicle comprising:

wheels for the vehicle;

a braking system including a friction element for inhibiting rotation of the wheels of the vehicle, the braking system having a dormant state wherein the friction element is at a first position spaced a first distance from the wheels, the braking system further including a brake pedal adapted to be depressed to move the friction element into engagement with a portion of the wheels of the vehicle; and a sensor for sensing an operational parameter of the vehicle;

wherein the friction element moves from the first position to a second position spaced a second distance from the wheels in response to a predetermined measurement of the operational parameter and before depression of the brake pedal, the second position being closer to the wheels than the first position.

2. The early braking system of claim 1, wherein:

the operational parameter is the position of a foot of a driver of the vehicle.

3. The early braking system of claim 2, further comprising:

a throttle configured to be engaged by the foot of the driver of the vehicle;

wherein the sensor senses the position of the throttle for sensing the position of the foot of the driver of the vehicle.

4. The early braking system of claim 1, further including:

a throttle for the vehicle;

wherein the operational parameter includes positions of the throttle.

5. The early braking system of claim 4, wherein:

the operational parameter is a measurement of the throttle between a first throttle position and a second throttle position, and the predetermined measurement is the rate of movement of the throttle between the first throttle position and the second throttle position.

6. The early braking system of claim 1, wherein:
the friction element moves from the second position to the first position if the brake pedal has not been depressed a predetermined time after the predetermined measurement of the operational parameter.

7. The early braking system of claim 1, further including:
a brake light having a non-energized state wherein no energy is applied to the brake light, an energized state wherein a high energy is applied to the brake light such that the brake light emits visible light, and a pre-energized state wherein a low energy is applied to the brake light whereby the brake light does not emit visible light;
wherein the brake light is energized to the pre-energized state in response to the predetermined measurement of the operational parameter.

8. The early braking system of claim 7, wherein:
the brake light moves from the pre-energized state to the non-energized state if the brake pedal has not been depressed a predetermined time after the predetermined measurement of the operational parameter.

9. An early brake warning system for a vehicle comprising:
a throttle for the vehicle;
a sensor for sensing an operational parameter of the throttle; and
a brake light having a non-energized state wherein no energy is applied to the brake light, an energized state wherein a high energy is applied to the brake light such that the brake light emits visible light and a pre-energized state wherein a low energy is applied to the brake light whereby the brake light does not emit visible light;
wherein the brake light is energized from the non-energized state to the pre-energized state in response to a predetermined measurement of the operational parameter of the throttle.

10. The early brake warning system of claim 9, wherein:
the operational parameter of the throttle is a measurement of the throttle between a first throttle position and a second throttle position, and the predetermined measurement is the rate of movement of the throttle between the first throttle position and the second throttle position.

11. The early brake warning system of claim 10, wherein:
the braking system includes a brake pedal adapted to be depressed to energize the brake light to the energized state; and
the brake light moves from the pre-energized state to the non-energized state if the brake pedal has not been depressed a predetermined time after the predetermined measurement of the operational parameter of the throttle has been sensed.

12. The early brake warning system of claim 9, further including:
a braking system including a friction element for inhibiting rotation of wheels of the vehicle, the braking system having a dormant state wherein the friction element is configured to be at a first position spaced a first distance from the wheels;
wherein the friction element moves from the first position to a second position in response to a predetermined measurement of the operational parameter and before depression of the brake pedal, the second position being configured to be closer to the wheels than the first position.

13. A method of initiating braking for a vehicle having wheels, the method comprising the steps of:
providing a braking system including a friction element for inhibiting rotation of the wheels of the vehicle, the braking system further including a brake pedal adapted to be depressed to move the friction element into engagement with a portion of the wheels of the vehicle, the braking system having a dormant state wherein the friction element is at a first position spaced a first distance from the wheels;
sensing an operational parameter of the vehicle with a sensor; and
moving the friction element from the first position to a second position spaced a second distance from the wheels in response to a predetermined measurement of the operational parameter and before depression of the brake pedal, the second position being closer to the wheels than the first position.

14. The method of initiating braking for a vehicle of claim 13, wherein the operational parameter is the position of a foot of a driver of the vehicle.

15. The method of initiating braking for a vehicle of claim 14, further comprising:
providing a throttle configured to be engaged by the foot of the driver of the vehicle;
wherein the step of sensing comprises sensing positions of the throttle for determining the operational parameter of the vehicle.

16. The method of initiating braking for a vehicle of claim 13, further including:
providing a throttle for the vehicle;
wherein the operational parameter includes positions of the throttle.

17. The method of initiating braking for a vehicle of claim 16, wherein:
the operational parameter is a measurement of the throttle between a first throttle position and a second throttle position, and the predetermined measurement is the rate of movement of the throttle between the first throttle position and the second throttle position.

18. The method of initiating braking for a vehicle of claim 13, further including:
moving the friction element from the second position to the first position if the brake pedal has not been depressed a predetermined time after the predetermined measurement of the operational parameter.

19. The method of initiating braking for a vehicle of claim 13, further including:
providing a brake light, the brake light having a non-energized state wherein no voltage is applied to the brake light, an energized state wherein a high voltage is applied to the brake light such that the brake light emits visible light and a pre-energized state wherein a low voltage is applied to the brake light wherein the brake light does not emit visible light; and
energizing the brake light to the pre-energized state in response to the predetermined measurement of the operational parameter.

20. The method of initiating braking for a vehicle of claim 19, further including:
energizing the brake light from the pre-energized state to the non-energized state if the brake pedal has not been depressed a predetermined time after the predetermined measurement of the operational parameter.

* * * * *